(12) United States Patent
Bernardoni

(10) Patent No.: US 9,901,914 B2
(45) Date of Patent: Feb. 27, 2018

(54) SELF-CLEANING, ANTI-SMOG, ANTI-MOULD PHOTOCATALYTIC POWDERED WATER BASED PAINT

(75) Inventor: Massimo Bernardoni, Rome (IT)

(73) Assignee: AM TECHNOLOGY LIMITED, Hertfordshire (GB)

(*) Notice: Subject to any disclaimer, the term of this patent is extended or adjusted under 35 U.S.C. 154(b) by 715 days.

(21) Appl. No.: 14/418,768

(22) PCT Filed: Aug. 2, 2012

(86) PCT No.: PCT/IB2012/053968
§ 371 (c)(1),
(2), (4) Date: Jan. 30, 2015

(87) PCT Pub. No.: WO2013/018059
PCT Pub. Date: Feb. 7, 2013

(65) Prior Publication Data
US 2015/0190797 A1 Jul. 9, 2015

(30) Foreign Application Priority Data

Aug. 2, 2011 (WO) .................. PCT/IT2011/000281

(51) Int. Cl.
| | | |
|---|---|---|
| *B01J 29/04* | (2006.01) | |
| *B01J 21/00* | (2006.01) | |
| *B01J 23/00* | (2006.01) | |
| *B01J 25/00* | (2006.01) | |
| *B01J 29/00* | (2006.01) | |
| *B01J 31/38* | (2006.01) | |
| *C04B 28/04* | (2006.01) | |
| *C04B 20/10* | (2006.01) | |
| *B01J 35/00* | (2006.01) | |
| *B01J 37/04* | (2006.01) | |
| *C04B 111/00* | (2006.01) | |
| *C04B 111/20* | (2006.01) | |

(52) U.S. Cl.
CPC ............. *B01J 31/38* (2013.01); *B01J 35/004* (2013.01); *B01J 35/0006* (2013.01); *B01J 37/04* (2013.01); *C04B 20/1048* (2013.01); *C04B 28/04* (2013.01); *B01J 2231/005* (2013.01); *B01J 2531/002* (2013.01); *C04B 2111/00508* (2013.01); *C04B 2111/2061* (2013.01); *Y02W 30/97* (2015.05)

(58) Field of Classification Search
USPC .................. 502/62, 100, 150, 300
See application file for complete search history.

(56) References Cited

U.S. PATENT DOCUMENTS

| | | | |
|---|---|---|---|
| 5,677,039 A | 10/1997 | Perrin et al. | |
| 6,406,536 B1 | 6/2002 | Cassar et al. | |
| 2002/0005145 A1* | 1/2002 | Sherman | B01J 13/0047 106/436 |
| 2012/0077906 A1* | 3/2012 | Herold | C04B 24/2623 524/2 |

FOREIGN PATENT DOCUMENTS

| | | |
|---|---|---|
| CN | 101209916 A | 7/2008 |
| EP | 0 633 964 | 10/1993 |
| EP | 0 784 034 A1 | 7/1997 |
| EP | 1 196 359 | 1/2001 |
| EP | 1 524 249 A1 | 4/2005 |
| EP | 1 559 753 A2 | 8/2005 |
| EP | 1 944 279 A2 | 7/2008 |
| JP | 2003183067 A | 7/2003 |
| KR | 20070092193 A | 9/2007 |
| WO | 93/20280 | 10/1993 |
| WO | 01/00541 A1 | 1/2001 |
| WO | 2008/017934 A2 | 2/2008 |
| WO | 2009/013337 A2 | 1/2009 |
| WO | 2009/013338 A1 | 1/2009 |
| WO | 2009/080647 A1 | 7/2009 |
| WO | 2010/012488 A1 | 2/2010 |
| WO | 2012/038810 A1 | 3/2012 |

OTHER PUBLICATIONS

International Search Report, dated Jan. 28, 2013, issued in International Application No. PCT/IB2012/053968.
International Preliminary Report on Patentability, dated Feb. 4, 2014, issued in International Application No. PCT/IB2012/053968.

* cited by examiner

*Primary Examiner* — James McDonough
(74) *Attorney, Agent, or Firm* — Saul Ewing Arnstein & Lehr LLP

(57) ABSTRACT

A photocatalytic powdered water based paint is described comprising photocatalytic binding cement, inert micronized limestone, low viscosity cellulose, fluidifying agent, anti-foaming agent, vinyl polymer and pigments. The water based paint is characterized by the fact of comprising at least one and preferably all the following further additives: metakaolin, titanium dioxide, calcium formate and kieselguhr.

4 Claims, No Drawings

SELF-CLEANING, ANTI-SMOG, ANTI-MOULD PHOTOCATALYTIC POWDERED WATER BASED PAINT

CROSS REFERENCE TO RELATED APPLICATIONS

This application claims the priority of PCT/IB2012/053968, filed on Aug. 2, 2012, which claims priority to International Application No. PCT/IT2011/000281, filed Aug. 2, 2011, the entire contents of each of which are incorporated fully herein by reference.

BACKGROUND OF THE INVENTION

The present invention relates to a photocatalytic powdered water based paint, i.e. a powdered compound that becomes a water based paint once diluted in water, that has considerable advantageous characteristics in addition to its main property of converting pollutants present in the air by photocatalysis, it being also able to remove bad smells, to prevent mould and bacterial cultures from developing on the supports painted therewith, as well as to prevent dark marks from developing on the surfaces because of its self-cleaning function and to prevent heat from being transmitted by reflecting the sunbeams.

Moreover the water based paint of the present invention is highly eco-friendly as it does not contain harmful products such as heavy metals (cadmium, mercury, arsenic, lead, hexavalent chromium), its content of volatile aromatic hydrocarbons (benzene and derivatives, toluene, o-xylene, styrene) is practically negligible, its content of volatile organic compounds (VOC) is less than 0.5 g/l, therefore it lends itself excellently to the application on any surfaces both made of stones and of metal or plastic, both for interiors and exteriors, in order not to alter over time the original appearance of buildings, monuments, public works of any kind.

Photocatalytic compositions have been known and used for some time for preserving the original appearance of cementitious, stone or marble structures protecting them from being attacked by pollutants in the air, by atmospheric agents and by the several difficulties generated by the present environmental conditions developed by the modern society. Examples of photocatalytic compositions based on titanium dioxide mixed with various additives are known for example in documents EP0784034, EP0633964, EP1196359, EP1944279, WO 2008/017934, WO 2009/080647 and WO 2010/012488. Although such compositions have led to satisfactory results, there is still the need for further improvements in order to overcome drawbacks, even important ones, that have not been solved by such compositions.

Among such drawbacks it is of particular importance the fact that their application is possible only by spraying them or by using a roller, while by the use of the brush the product does not spread leaving the so called brush marks, that is brush strokes are in relief resulting in a not much satisfactory aesthetical appearance; moreover the maturing of the product and its mechanical strengths over time resulted in a chalking of the paint; other drawbacks were the difficulty in application, hiding power, non optimal point of white and mechanical performances; and the possibility of the formation of efflorescences due to the phenomenon of hydrolysis lime.

Further examples of photocatalytic compositions based on titanium dioxide mixed with various additives are disclosed in documents WO 2009/013337 and U.S. Pat. No. 6,406,536 that, however, are not able to give an optimal photocatalytic activity to the paint.

All these problems have been solved with a long lasting work studying problems, trials, tests and analyses, that have led to the selection of optimal ingredients and have led to the realization of the excellent photocatalytic water based paint of the present invention.

In particular, it has been surprisingly found that excellent photocatalytic characteristics are given to paint by using nanoparticle material.

In order to achieve a real and effective improvement of the water based paint, several searches and tests have been accomplished on the several types of raw materials, starting from a standard laboratory mixture composed of photocatalytic cement as a binder and as fundamental matrix for photocatalysis development, micronized limestone and of very low viscosity cellulose, to which additives have been added from time to time in order to solve each problem initially related to such type of water based paint. Tests represented below show the real efficacy of the new additives in comparison to other additives of the same type that were used previously. The overall final mixture constituting the water based paint according to the present invention derives from all the new additives investigated in said tests that are incorporated therein and therefore, the composition of said final mixture, used later for performing the production tests, is shown below in this document, after discussing said tests.

More precisely, said photocatalytic cement, used as a binder and as fundamental matrix for photocatalysis development, is Portland cement admixed with nanoparticle photocatalytic Titanium Dioxide, the size of said Titanium Dioxide nanoparticles being lower than 5 nanometers (thousandths of micron); even more precisely, said photocatalytic cement is white Portland cement, this colour, substantially given by the Titanium Dioxide, being preferable in order to be able subsequently, in case, to colour the cement (which is hardly feasible from grey colour).

As previously stated, it has been surprisingly found that excellent photocatalytic characteristics are given to paint by using nanoparticle material; it is believed, without intending to be bound by this theory, that the nanoparticle material activates the photocatalysis making effective the release of an electron, specifically when a product painted with the paint according to the present invention is hit by a light with a wavelength of about 380 µm.

More precisely, said micronized limestone is inert limestone with a maximum grain-size distribution lower than 100 microns.

More precisely, said very low viscosity cellulose is cellulose with viscosity lower than 1,000 mPas; it is here considered useful to specify that the average viscosity of a cellulose is about 13,000-15,000 mPas, it is high over 20,000 mPas and it is very low below 1,000 mPas.

More precisely, the additives intended for solving specific problems are a fluidizer, an antifoam, a vinyl polymer and pigments; even more precisely, at least one and preferably all the following additional additives are comprised: metakaolin, calcium formate and kieselguhr.

Preferably, said fluidizer is a polycarboxylic acid fluidizer and said vinyl polymer is a hydrophobized vinyl polymer.

For clarity's sake we want here to point out that, in the present description, the technical term "hydrophobized" means the water repellence property, i.e. the ability to repel water, that is intended to be given to a product.

Preferably, said pigments are coated with a cellulose-based film that, when comes in contact with water, dissolves releasing the pigment, said film preferably dissolving in a time lower than 2 seconds and more preferably in less than 1 second; moreover, preferably, said pigments are formed into granules whose dimensions have a grain-size range from 200 to 500 microns.

Preferably the composition according to the present invention further comprises low photocatalytic activity Titanium Dioxide, which serves to increase the paint whiteness.

SUMMARY OF THE INVENTION

In a preferred embodiment of the paint according to the present invention, the ingredients are contained in said paint formulation in the percentages by weight given in the following table:

| RAW MATERIALS OF THE INVENTIVE FORMULATION | From % | To % |
|---|---|---|
| White Portland cement admixed with nanoparticle photocatalytic Titanium Dioxide | 40 | 50 |
| Inert limestone with a maximum grain-size distribution lower than 100 microns | 50 | 55 |
| Metakaolin | 1.5 | 10 |
| Low photocatalytic activity Titanium Dioxide | 1.5 | 10 |
| Cellulose with viscosity lower than 1,000 mPas | 0.05 | 1.5 |
| Calcium formate | 0.5 | 5 |
| Tartaric acid | 0.05 | 1.5 |
| Polycarboxylic acid fluidizer | 0.1 | 1.2 |
| Hydrophobized vinyl polymer | 3 | 10 |
| Antifoam | 0.1 | 2.8 |
| Low viscosity cellulose | 0.1 | 1.2 |
| Kieselguhr | 0.5 | 3.5 |
| Pigments | q.s. | q.s. |

Another object of the present invention, in case independent and usable autonomously from the other aspects of the invention, relates to a manufacturing method of a powdered paint to be diluted in water, comprising the steps of separately weigh the following elements:
- white Portland cement admixed with nanoparticle photocatalytic Titanium Dioxide,
- inert limestone with a maximum grain-size distribution lower than 100 microns,
- metakaolin,
- calcium formate and
- kieselguhr wherein said elements have the following percentage by weight:

| ELEMENT | From % | To % |
|---|---|---|
| White Portland cement admixed with nanoparticle photocatalytic Titanium Dioxide | 40 | 50 |
| Inert limestone with a maximum grain-size distribution lower than 100 microns | 50 | 55 |
| Metakaolin | 1.5 | 10 |
| Low photocatalytic activity Titanium Dioxide | 1.5 | 10 |
| Calcium formate | 0.5 | 5 |
| Kieselguhr | 0.5 | 3.5 | and wherein the method involves loading into a mixer said elements together with the other elements such as cellulose with a viscosity lower than 1,000 mPas, tartaric acid, polycarboxylic acid fluidizer, hydrophobized vinyl polymer, antifoam, low viscosity cellulose and pigments, said mixer comprising at least one mixing blade and turbulators, the mixing of the components being carried out in a first stage with only the help of the mixing blade for a first coarse mixing of the ingredients and in a subsequent second stage activating also the internal turbulators of the mixer to obtain a more intimate mixing also of the finest parts of the components, the mixing times of the first stage and of the second stage being equal.

Another object of the present invention, in case independent and usable autonomously from the other aspects of the invention, relates to a paint obtained with the above-described method.

In the following correlation table there is the list of all the ingredients used for performing the laboratory tests shown below:

| Trade name | Type of product | Manufacturer |
|---|---|---|
| Cement TX | Photocatalytic binder with titanium dioxide | Italcementi SpA Bergamo, Italia |
| Micronized MIXER 100 | Micronized limestone 20μ | Mineraria Ligure Srl Marina di Carrara, Italia |
| Melflux 2651 F | Polycarboxylic superfluidifying agent | BASF Construction Polymers Gmbh Trostberg Geramany |
| Titanium R-XL | Titanium dioxide | Tioxide Europe Srl Grosseto, Italia |
| Culminal mhpc 500 pf | Methylhydroxy-propylcellulose | Hercules Aqualon division Bevern, Belgium |
| Tecnocell 500 | Functional cellulose fibre | CFF Gmbh Gehren, Germany |
| Vinnapas 8034 H | Hydrophobic vinyl polymer | Wacker Chemie Italia Sri Milano, Italia |
| Calcium formate | Pure calcium formate | Dolder Massara Srl Varese, Italia |
| Celite 209 | Kieselguhr | World Minerals Italia Srl Milano, Italia |
| Defoamex AP 199 | Anti-foaming agent | Lamberti Spa Varese, Italia |

DETAILED DESCRIPTION OF THE INVENTION

Test 1—Improvement in the Hiding Power of the Product. Test Performed by Application on a Contrast Card.

1. Weighing in two suitable containers the following components:

| COMPOSITION A | | COMPOSITION B | |
|---|---|---|---|
| Product | Weight | Product | Weight |
| Cement TX | 1000 gr. | Cement TX | 1000 gr. |
| Micronizzato C138M | 1000 gr. | MIXER 100 | 1000 gr. |
| Culminal mhpc 500 pf | 10 gr. | Culminal mhpc 500 pf | 10 gr. |
| Melflux 2651F | 6 gr. | Melflux 2651F | 6 gr. |
| | | Titanium R-XL | 100 gr. |

2. Dry-mixing the components, naming them as follows: COMPOSITION A, COMPOSITION B.

Afterwards it will be possible to make the mix by means of laboratory mixing equipment (Hobart):

3. Placing 350 gr. of water in the Hobart and under agitation adding 1000 gr. of the sample called COMPOSI- TION A, after 15" verifying that there is no material adherent to the walls of the mixer, should this be the case removing it by a paddle and continuing the mixing at a high number of revolutions for further 120", settling for 60" and adding further 250 gr. of water with a low number of revolutions for 45".

4. Repeating step 3. with the sample called COMPOSITION B.

5. Placing a suitable amount of the mixed materials, on the contrast card making sure that they are adjacent one another and not overlapped one another.

6. By means of the 150µ film applicator, spreading the material up to the end of the card.

7. After drying verifying that the material has covered the white to black contrast.

TABLE 1

| RAW MATERIALS | COMPOSITION A | COMPOSITION B |
|---|---|---|
| Cement TX | 49.6% | 47.25% |
| Micronized MIXER 100 | | 47.25% |
| Micronized C138 M | 49.6% | |
| Titanium R-XL | | 4.7% |
| Culminal mhpc 500 pf | 0.5% | 0.5% |
| Melflux 2651F | 0.3% | 0.3% |

Test Results:
COMPOSITION A: contrast covered by 25%
COMPOSITION B: contrast covered by 75%
Final Notes:
Table 1 schematically shows the compositions and their percentages by means of which the hiding power test has been performed. Composition B is definitely better because of the high point of white given by adding titanium dioxide, and because of the hiding power due to the micronized mixer 100 since it is finer than micronized C 138 M.

Test 2—Improvement in the Product Fluidity.
Test Performed by Means of the Ford Cup no. 4
1. Weighing in a suitable container the following components:

| Cement TX | 1000 gr. |
|---|---|
| MIXER 100 | 1000 gr. |
| Culminal mhpc 500 pf | 10 gr. |

2. Dry-mixing the components and dividing them into two further samples each one of 1000 gr., naming them as follows: Cp. 1a, Cp. 2b.

3. Adding to the sample called Cp. 1a 4.0 gr. of MELMENT F 10, and dry-mixing it. Adding to the sample called Cp. 2b 3.0 gr. of MELFUX 2651F, and dry-mixing it.

Afterwards it will be possible to make the mix for performing the viscosity test by means of the Ford cup:

4. Placing 350 gr. of water in the Hobart (laboratory mixer) and under agitation adding 1000 gr. of the sample called Cp. 1a, after 15" verifying that there is no material adherent to the walls of the mixer, should this be the case removing it by a paddle and continuing the mixing at a high number of revolutions for further 120", settling for 60" and adding further 250 gr. of water at a low number of revolutions for 45". With the obtained mix, reading the viscosity by Ford cup no. 4.

5. Repeating step 4. with the sample called Cp. 2b.

6. Writing the results and verifying which is the product with the highest fluidity.

TABLE 2

| RAW MATERIALS | Cp. 1a | Cp. 2b |
|---|---|---|
| Cement TX | 49.65% | 49.65% |
| Micronized MIXER 100 | 49.65% | 49.65% |
| Culminal mhpc 500 pf | 0.5% | 0.5% |
| Melment F 10 | 0.2% | |
| Melflux 2651F | | 0.2% |

Test Results:
Viscosity after test by Ford cup Cp. 1a: 80"
Viscosity after test by Ford cup Cp. 2b: 40"
Final Notes:
Table 2 schematically shows the compositions and their percentages by means of which the viscosity test by Ford cup no. 4 has been performed; it can be clearly seen by the results that, although having a low dosage, the product containing MELFLUX 2651F (Cp. 2b) makes the system more fluid, therefore increasing the processability of the product and improving the final aesthetical appearance.

Test 3—Improvement of the Setting Time and of the Mechanical Strengths of the Product.
Test Performed by Means of Vicat Needle.
1. Weighing in two suitable containers the following components:

| COMPOSITION 1A | | COMPOSITION 1F | |
|---|---|---|---|
| Cement TX | 1000 gr. | Cement TX | 1000 gr. |
| MIXER 100 | 1000 gr. | MIXER 100 | 1000 gr. |
| Culminal mhpc 500 pf | 10 gr. | Culminal mhpc 500 pf | 10 gr. |
| Melflux 2651F | 3 gr. | Melflux 2651F | 3 gr. |
| | | Calcium formate | 40 gr. |

2. Dry-mixing the components naming the obtained products as COMPOSITION 1A and COMPOSITION 1F.

Afterwards it will be possible to make the mix in order to take the setting time by means of Vicat needle:

3. Noting down the time when the test begins, placing 350 gr. of water in the Hobart (laboratory mixer) and under agitation adding 1000 gr. of the sample called COMPOSITION 1A, after 15" verifying that there is no material adherent to the walls of the mixer, should this be the case removing it by a paddle and continuing the mixing at a high number of revolutions for further 120", settling for 60" and adding further 250 gr. of water at a low number of revolutions for 45".

4. Placing the obtained mix in the frustum of cone of the Vicat needle, that has been previously calibrated.

5. Bringing the plunger in contact with the mix and releasing the plunger such that it can penetrate into the mix, reading the penetration, noting down the time and penetration, cleaning the plunger.

6. Repeating step 5. at regular time periods decreasing the rest time between one penetration and the following one after setting has started. The setting is said to have started when the penetration of the plunger is not more at full scale, but it stops at least by 2 mm., the test is said to have ended when the plunger is not more able to penetrate into the mix by at least 3 mm.

Repeating steps 3., 4., 5., 6., with the sample called as COMPOSITION 1F.

In this case, due to the length of the test, an automatic Vicat needle has been used, by setting the penetration time, then data have been stored by the internal software.

TABLE 3

| RAW MATERIALS | COMPOSITION 1A | COMPOSITION 1F |
|---|---|---|
| Cement TX | 49.68% | 48.73% |
| Micronized MIXER 100 | 49.68% | 48.73% |
| Culminal mhpc 500 pf | 0.49% | 0.49% |
| Melflux 2651F | 0.15% | 0.15% |
| Calcium formate | | 1.90% |

Test Results:

TABLE 4

| | Start of setting | End of setting |
|---|---|---|
| COMPOSITION 1A | 6 h 30' | 12 h 20' |
| COMPOSITION 1F | 5 h 30' | 7 h 20' |

Final Notes:

Table 3 schematically shows the compositions and their percentages by means of which the setting time test has been performed, and table 4 shows the results; from these results it can be clearly noted that the calcium formate plays an important reaction role with the cement paste causing the paste to set more quickly, such situation allows the final paint to be exposed earlier to the atmospheric agents without being subjected to considerable changes as it occurs with long setting time such as the case of the composition 1A.

Test 4—Improvement of the Resistance to Water.

Water Drop Test on the Contrast Card

1. Weighing in two suitable containers the following components:

| COMPOSITION A | | COMPOSITION B | |
|---|---|---|---|
| Cement TX | 1000 gr. | Cement TX | 1000 gr. |
| MIXER 100 | 1000 gr. | MIXER 100 | 1000 gr. |
| Culminal mhpc 500 pf | 10 gr. | Culminal mhpc 500 pf | 10 gr. |
| Melflux 2651F | 6 gr. | Melflux 2651F | 6 gr. |
| Pentaresin P3 | 100 gr. | Vinnapas 8034H | 100 gr. |

2. Dry-mixing the components, naming them as follows: COMPOSITION A, COMPOSITION B.

Afterwards it will be possible to make the mix by means of laboratory mixing equipment (Hobart):

3. Placing 350 gr. of water in the Hobart and under agitation adding 1000 gr. of the sample called COMPOSITION A, after 15" verifying that there is no material adherent to the walls of the mixer, should this be the case removing it by a paddle and continuing the mixing at a high number of revolutions for further 120", settling for 60" and adding further 250 gr. of water at a low number of revolutions for 45".

4. Repeating step 4. with the sample called COMPOSITION B.

5. Placing a suitable amount of the mixed materials, on the contrast card that has been previously named with the type of composition under testing.

6. By means of the 150μ film applicator, spreading the material up to the end of the card.

7. After drying, pouring some water drops on the applied film, after its evaporation investigating the film condition.

TABLE 5

| RAW MATERIALS | COMPOSITION A | COMPOSITION B |
|---|---|---|
| Cement TX | 47.25% | 47.25% |
| Micronized MIXER 100 | 47.25% | 47.25% |
| Culminal mhpc 500 pf | 0.47% | 0.47% |
| Melflux 2651F | 0.3% | 0.3% |
| Pentaresin P3 | 4.73% | |
| Vinnapas 8034H | | 4.73% |

Test Results:

COMPOSITION A: Partial softening of the film after evaporation of the water drop.

COMPOSITION B: In some case a slight mark after evaporation of the water drop.

Final Notes:

Table 5 schematically shows the compositions and their percentages by means of which the water drop test has been performed. The composition B yields a better performance the film does not undergo any softening and the mark generated only in cases with a larger drop.

By combining together the results obtained from tests 1-4, shown above, therefore it has been decided to add to the standard mixture the new additives tested in said tests and specifically the titanium dioxide and the fine micronized limestone in order to improve the product hiding power (Test 1), the polycarboxylic acid-based fluidifying agent in order to improve the product viscosity (Test 2), the calcium formate in order to improve the setting time and the mechanical strengths of the product (Test 3) and the hydrophobic vinyl polymer in order to improve the resistance to water of the product (Test 4).

Thus we arrived to the final formulation of the excellent water based paint of the present invention, summarized in the following table, wherein the percentages by weight are the optimal and preferred ones but they are not limitative.

| RAW MATERIALS OF THE INVENTIVE FORMULATION | From % | To % |
|---|---|---|
| Cement TX - photocatalytic binder | 40 | 50 |
| Micronized Mixer 100 - limestone more fine and with a higher hiding power - Test 1 | 45 | 55 |
| Power Pozz White - metakaolin | 1.5 | 10 |
| Titanium dioxide - hiding white - Test 1 | 1.5 | 10 |
| Culminal mhpc 500 pf - very low viscosity cellulose | 0.05 | 1.5 |
| Calcium formate - set accelerator - Test 3 | 0.5 | 5 |
| Tartaric acid - set retarder | 0.05 | 1.5 |
| Melflux 2651F - polycarboxylic acid fluidifying agent - Test 2 | 0.1 | 1.2 |
| Vinnapas 8034 - hydrophobic vinyl polymer - Test 4 | 3 | 10 |
| Deofoam AP199 - anti-foaming agent | 0.1 | 2.8 |
| Tecnocell 500 - low viscosity cellulose fibres | 0.1 | 1.2 |
| Celite - kieselguhr | 0.5 | 3.5 |
| Immediately dispersible pigments Pantocrom | q.s. | q.s. |

Thus we have come to the final formulation of the excellent water based paint of the present invention. As regards the production of the water based paint from the production perspective, the mixing plant of the applicant located in Marcellina, province of Rome, has been used; after having found the ideal composition in laboratory after the tests previously described, it has been necessary to store the raw materials to be used into the storage silos that have been accurately emptied and cleaned, then the recipe has been stored in the production managing software, (recipe code no. 75) such that all the weighings of the recipe occur in a completely automated manner reducing to zero the possibilities of doing weighing errors, the production scales MEMOMATIC model type 7053 called as scale 1, scale 2, scale 3, as the mixer model M-TEC type MR 150V serial number 9161092002 are subjected to a annual calibration and inspection. The production process can be summarized as follows:

Automatically weighing the cement by means of a charging feeder directly on the scale 1;
Unloading the scale 1 into the mixer;
Automatically weighing the additives by means of charging feeders directly on scale 3;
Unloading the scale 3 into the mixer;
Automatically weighing the micronized by means of a charging feeder directly on scale 2;
Unloading the scale 2 into the mixer;
Starting to mix firstly only by the help of the mixing blade, then even by means of three turbulators provided within the mixer (the blade serves for roughly mix the raw materials inserted therein, while the turbulators allow even the finest parts of the components to be mixed more closely)
Unloading the mix into the storage silos.

The mixing time of the blade and of the turbulators have been set on the basis of the acquired experience in the following mode:

Blade mixing time 180"
Turbulator mixing time 180".

In order to verify the complete homogeneity of the components several material samples have been taken in various phases during the paint canning, and after having mixed the material using always the same method used in the laboratory tests, viscosity has been investigated, we have obtained the same value in each case, therefore the material is completely homogeneous in the whole production lot thereof.

Table 6 shows the values detected during the production control.

TABLE 6

| SAMPLE | VISCOSITY |
|--------|-----------|
| START | 55" |
| SAMPLE 1/3 | 55" |
| SAMPLE 2/3 | 55" |
| END | 55" |

Therefore it is possible to conclude that a very high quality photocatalytic water based paint has been obtained, helping in maintaining the air clean and the building faces more clean for a long time, decreasing their reconstruction costs, it is easy to be applied, it has considerably improved characteristics of hiding power, viscosity, water resistance, setting time and mechanical strength. It has to be pointed out also that the indication of the trade name of the several used additives is not to be considered as a limitation but as a mere example and such additives can be replaced by other products having like characteristics and meeting the same requirements set forth in the previous description and in the annexed claims.

The invention claimed is:

1. Photocatalytic powdered paint for use diluted in water, comprising Portland cement admixed with nanoparticle photocatalytic Titanium Dioxide, the size of said Titanium Dioxide nanoparticles being lower than 5 nanometers; inert limestone with a maximum grain-size distribution lower than 100 microns; very low viscosity cellulose with viscosity lower than 1,000 mPas; fluidizer; antifoam; vinyl polymer and pigments, further comprising at least one and preferably all the following further additives: metakaolin, calcium formate and kieselguhr, wherein said fluidizer is a polycarboxylic acid fluidizer, wherein said vinyl polymer is a hydrophobized vinyl polymer and wherein the ingredients are contained in a formulation in ranges of percentages by weight shown in the following table

| RAW MATERIALS OF THE FORMULATION | From % | To % |
|---|---|---|
| White Portland cement admixed with nanoparticle photocatalytic Titanium Dioxide | 40 | 50 |
| Inert limestone with a maximum grain-size distribution lower than 100 microns | 50 | 55 |
| Metakaolin | 1.5 | 10 |
| Low photocatalytic activity Titanium Dioxide | 1.5 | 10 |
| Very low viscosity cellulose | 0.05 | 1.5 |
| Calcium formate | 0.5 | 5 |
| Tartaric acid | 0.05 | 1.5 |
| Polycarboxylic acid fluidizer | 0.1 | 1.2 |
| Hydrophobized vinyl polymer | 3 | 10 |
| Antifoam | 0.1 | 2.8 |
| Low viscosity cellulose | 0.1 | 1.2 |
| Kieselguhr | 0.5 | 3.5 |
| Pigments | q.s. | q.s. | wherein said pigments are coated with a cellulose-based film that, when coming into contact with water, dissolves to release the pigment, said film dissolving in a time lower than 2 seconds.

2. Paint according to claim 1, wherein said pigments are formed into granules whose dimensions have a grain-size range from 200 to 500 microns.

3. Paint according to claim 1, said film dissolving in a time lower than 1 second.

4. Paint according to claim 3, wherein said pigments are formed into granules whose dimensions have a grain-size range from 200 to 500 microns.

* * * * *